(12) United States Patent
Beerens et al.

(10) Patent No.: US 12,428,085 B2
(45) Date of Patent: Sep. 30, 2025

(54) DISPLAY DEVICE FOR A BICYCLE

(71) Applicant: Mahle International GmbH, Stuttgart (DE)

(72) Inventors: Christoph Beerens, Stuttgart (DE); Nadine Wehking, Stuttgart (DE); Tillman Zumstein, Stuttgart (DE)

(73) Assignee: Mahle International GmbH (DE)

( * ) Notice: Subject to any disclaimer, the term of this patent is extended or adjusted under 35 U.S.C. 154(b) by 595 days.

(21) Appl. No.: 17/732,488

(22) Filed: Apr. 28, 2022

(65) Prior Publication Data
US 2022/0348280 A1    Nov. 3, 2022

(30) Foreign Application Priority Data

Apr. 29, 2021 (DE) .................. 102021204300.3

(51) Int. Cl.
| | |
|---|---|
| *B62J 6/26* | (2020.01) |
| *A42B 3/30* | (2006.01) |
| *B62J 6/01* | (2020.01) |
| *B62J 6/04* | (2020.01) |
| *B62J 45/41* | (2020.01) |
| *F21V 23/04* | (2006.01) |
| *G01S 13/931* | (2020.01) |

(Continued)

(52) U.S. Cl.
CPC ................. *B62J 6/26* (2020.02); *A42B 3/30* (2013.01); *B62J 6/01* (2020.02); *B62J 6/04* (2013.01); *B62J 45/41* (2020.02); *F21V 23/0471* (2013.01); *G01S 13/931* (2013.01); *G08G 1/166* (2013.01); *H05B 47/115* (2020.01); *F21W 2103/30* (2018.01); *F21W 2107/13* (2018.01); *F21Y 2115/10* (2016.08)

(58) Field of Classification Search
CPC ....... B62J 6/26; B62J 6/01; B62J 6/04; H05B 47/115; F21V 23/0471; G08G 1/166; G01S 13/931
See application file for complete search history.

(56) References Cited

U.S. PATENT DOCUMENTS

| | | | |
|---|---|---|---|
| 5,865,265 A * | 2/1999 | Matsumoto ........... | G01S 13/931 340/901 |
| 2006/0069499 A1* | 3/2006 | Suzuki .................. | G01C 21/20 701/443 |

(Continued)

FOREIGN PATENT DOCUMENTS

| | | |
|---|---|---|
| CH | 714 099 A2 | 3/2019 |
| CN | 211060084 U | 7/2020 |

(Continued)

OTHER PUBLICATIONS

European Search Report dated Sep. 23, 2022 for European Patent Application No. 22 16 9509.

(Continued)

*Primary Examiner* — Alexander H Taningco
*Assistant Examiner* — Pedro C Fernandez
(74) *Attorney, Agent, or Firm* — Fishman Stewart PLLC

(57) ABSTRACT

A display device for a bicycle, e.g., a Pedelec, and/or a bicycle element, and a method of operating a bicycle with a display device are disclosed. The display device includes a carrier for mounting on a handlebar of the bicycle or for mounting on a bicycle helmet. On the carrier, a plurality of controllable luminous elements are arranged.

23 Claims, 3 Drawing Sheets

(51) Int. Cl.
*G08G 1/16* (2006.01)
*H05B 47/115* (2020.01)
*F21W 103/30* (2018.01)
*F21W 107/13* (2018.01)
*F21Y 115/10* (2016.01)

(56) References Cited

U.S. PATENT DOCUMENTS

| | | | | |
|---|---|---|---|---|
| 2013/0110355 A1* | 5/2013 | Cho | ............... | G01S 7/4026 |
| | | | | 701/49 |
| 2020/0346706 A1* | 11/2020 | Isenschmid | ............ | G08G 1/166 |
| 2021/0039737 A1* | 2/2021 | Montez | ............... | H04N 23/90 |
| 2021/0155157 A1* | 5/2021 | Godsey | ............... | B60Q 9/005 |

FOREIGN PATENT DOCUMENTS

| | | |
|---|---|---|
| DE | 102012000568 A1 | 7/2013 |
| EP | 3676163 A1 | 7/2020 |
| WO | 2019043576 A1 | 3/2019 |
| WO | 2020054528 A1 | 3/2020 |

OTHER PUBLICATIONS

English abstract for DE-10 2012 000 568.
German Search Report for DE-102021204300.3, dated Jan. 26, 2022.

* cited by examiner

DISPLAY DEVICE FOR A BICYCLE

CROSS-REFERENCE TO RELATED APPLICATION

This application claims priority to German Application No. DE 10 2021 204 300.3 filed on Apr. 29, 2021, the contents of which are hereby incorporated by reference in its entirety.

TECHNICAL FIELD

The invention relates to a display device for a bicycle, preferably for a Pedelec. Further, the invention relates to a bicycle having at least one such display device and to a method for operating such a bicycle.

BACKGROUND

Bicycles, in particular with electric drive, are increasingly employed in road traffic. However, this also increases the risk for traffic accidents in which such bicycles are involved. This applies in particular to bicycles with electric drive, which easily make possible locomotion at a relatively high speed of 25 km/h and more.

Hazard situations develop in particular when the rider of the bicycle is unable to timely detect other road users who are situated in a rearward region of the bicycle. Although it is known to mount a rear view mirror on the handlebar of the bicycle, with which the rider of the bicycle can also continuously monitor the rearward region of the bicycle, in particular without having to turn his turn the head backwards. However, such rear view mirrors prove to be particularly susceptible to being damaged and are also uncomfortable in handling. For this reason, most users of a bicycle do without such a rear view mirror in practice.

Before this background it is an object of the present invention to create a display device by means of which the attention of the rider of a bicycle can be drawn to any road users who may present in the rearward region of his bicycle. Further, it is an object of the present invention to provide a bicycle having such a display device. Finally, it is also an object of the present invention to create a method for operating such a bicycle.

These objects are solved through the subjects of the independent patent claims. Preferred embodiments are subject of the dependent patent claims.

SUMMARY

Accordingly, the basic idea of the invention is to provide a display device with multiple electrically controllable luminous elements and to design these so that the display device can be mounted on a handlebar of the bicycle or installed on a bicycle helmet for protecting the person wearing the helmet—in the following referred to as "helmet wearer"—against head injuries, so that the luminous elements in turn can be seen by the user or rider of the bicycle. In this way, the display device can be used in order to inform the user of the bicycle by switching-on, switching-off or switching-over individual or all luminous elements regarding potentially dangerous traffic situations that can occur in the rearward region of the vehicle. Thus, the display device assumes in particular the function of a warning device for the user or rider of the bicycle.

In this context, "switching-on" means that a luminous element previously not emitting any light is put into a state in which it does emit light. Here, "switching-off" means that a luminous element already emitting light is put into a state in which it no longer emits any light. Here "switching-over" means that the type of the light emission is changed. This relates in particular to the colour and/or the brightness of the light emitted by the luminous element if the luminous element is designed for emitting light with different colours or different brightness.

By interaction of the display devices according to the invention with a suitable radar sensor which monitors the rearward region of the bicycle it is thereby possible to draw the attention of the user or rider of the bicycle to road users present in the rearward region. Such road users can be other bicycles but also motor vehicles, in particular passenger vehicles and utility vehicles as well as pedestrians. In all mentioned cases, the rider or user of the bicycle is alerted to possible hazard situations and can consequently better and timely react to these hazard situations.

For detecting such a hazard situation it is not necessary to turn the turn the head backwards at regular intervals while driving the bicycle so that the rider can concentrate on what is in front of the bicycle.

In order to be able to mount the display device on the handlebar of the bicycle, it is proposed to equip the display device according to the invention with an annular carrier which can be fastened to the outside of the handlebar in the manner of a clamp. This makes possible a simple mounting of the display device on the bicycle. In particular it is possible to mount even two display devices on the handlebar, for example each in the region of a left and right handle present on the handlebar, which are provided for the handlebar being gripped by the user or rider. This makes it possible to assign the display device arranged on the left handle to traffic situations which occur in a region to the left behind the bicycle and accordingly assign the display device arranged on the right handle to traffic situations which occur in a region to the right behind the bicycle.

A display device for a bicycle according to the invention, preferably for a Pedelec, includes a carrier for mounting on a handlebar of the bicycle or for mounting to a bicycle helmet. According to the invention, a plurality of controllable luminous elements for emitting light is arranged on the carrier. Such luminous elements can be in particular light emitting diodes (LED) which can preferably be arranged next to one another—in particular in the manner of a luminous strip—on the carrier of the display device.

According to a preferred embodiment, the carrier has an annular or hollow cylindrical geometry which for mounting on a handlebar of the bicycle is formed in two parts and includes two ring segment-shaped, preferentially semi-annular carrier elements each. These two carrier elements are connected in an articulated manner by means of a hinge and are adjustable between a closed position, in which the two carrier elements enclose a ring opening, and an open position, in which they can be mounted or demounted on/from the bicycle, in particular a handlebar of the bicycle. Such a clamp-like design of the carrier or of the display device makes possible a simple mounting on the handlebar which is typically formed by a handlebar rod or by a tubular body. In this way, the annular carrier with the two ring segment-shaped carrier elements can be easily mounted on the handlebar or on the handlebar rod or to the tubular body.

According to a preferred embodiment, the carrier includes a fixing device which is arranged in the region of the two circumferential ends of the carrier elements facing away from the hinge and by means of which the two carrier elements can be fixed or are fixed to one another in the closed position. In this way, a permanently stable fixing of the display device on the handlebar of the bicycle can be ensured.

Particularly practically, at least one luminous element can be arranged on a, preferably exactly one, front side of the carrier, in particular of at least one of the two carrier elements. By way of this it is ensured with suitable orientation of the front side—typically towards the centre longitudinal axis of the bicycle—that the user or rider of the bicycle can clearly perceive the luminous elements and thus the light emitted by these if applicable, so that the display device can also fulfil the desired objective of a warning device for hazard situations in road traffic.

Particularly practically, at least one luminous element is arranged on an outer circumferential side of the carrier, in particular of at least one of the two carrier elements. Alternatively to this, all luminous elements can be arranged on the front side of the carrier. According to a further alternative, a (first) part of the luminous elements can be arranged on the carrier on the circumferential side and a (second) part of the luminous elements on the front side. In this alternative, the multiple luminous elements consist in particular of the first part and the second part, i.e. each luminous element is assigned either to the first part or to the second part. The measures mentioned above each ensure that with suitable orientation of the display device on the handlebar, typically towards the centre longitudinal axis of the bicycle, it is ensured that the user or rider of the bicycle can clearly detect the luminous elements and thus the light emitted by these if applicable.

According to another preferred embodiment, an electrical connection is provided on the carrier by means of which the luminous elements can be electrically connected by wiring to a control/regulating device of the bicycle. In this way, the display device can be connected, without major effort and thus also cost-effectively, to a control/regulating device present on a bicycle for controlling the luminous elements of the display devices. Alternatively to this, the display device can be equipped with a communications unit by means of which the display device can wirelessly communicate with a control/regulating device, so that the control/regulating device can wirelessly control the display device.

According to an advantageous further development, the luminous elements are designed so as to be separately controllable. In this way, manifold possibilities of alerting the rider of the bicycle to different possible hazard situations that can occur in particular in connection with road users present in the rearward region of the bicycle by suitably controlling individual, multiple or all luminous elements. In particular, specific light sequences can be generated in which individual, multiple or all luminous elements are controlled—i.e. switched on, switched off or switched over—offset in time relative to one another.

According to a further advantageous further development, the luminous elements can be covered by means of a protective cover that is transmissive to the light emitted by the luminous elements. In this way, the luminous elements are also protected during continuous operation in a bicycle against damage by mechanical effects, dirt, moisture and the like so that the lifespan of such a display device with protective cover is increased relative to display devices without such a protective cover.

According to a further advantageous further development, at least one, preferably multiple, particularly preferably all of the luminous elements is/are designed so that it/they can optionally emit light with one of at least two, preferably multiple different colours and/or that it/they can emit light with different brightness. In this way, the number of different possibilities, by means of which the rider can be alerted through light emission to different hazard situations, which may materialise in particular in connection with road users present in the rearward region of the bicycle, increases.

The invention, further, relates to a bicycle helmet for use with a bicycle and for protecting a helmet wearer from head injuries. The bicycle helmet includes a helmet body of shell-type design for absorbing external mechanical shocks and impacts and a helmet visor mounted, preferentially adjustably, to the helmet body. Further, the bicycle helmet includes two display devices according to the invention preferentially arranged next to one another on or at the helmet visor. The carrier of the display device can also be embodied as a mechanically rigid strip or as an elastic strip wherein the latter version can be more easily adapted to helmet visors with an even surface. The advantages of the display device according to the invention explained above therefore apply also to the bicycle helmet with the display devices according to the invention. The two display devices are arranged on the helmet visor so that they are visible to the helmet wearer while wearing the helmet. In addition, the bicycle helmet includes an electric energy store—in particular a, preferentially rechargeable, electric battery—for supplying the display devices with electric energy and a communications unit for wirelessly connecting the display devices to a control/regulating device of the bicycle.

According to a preferred embodiment of the bicycle helmet according to the invention, the bicycle helmet comprises a centre longitudinal axis which divides the vehicle helmet into a left and into a right helmet half. In this embodiment, one of the two display devices is arranged in the left helmet half on the helmet visor and the other display device on the right helmet half on the helmet visor. This allows assigning the display device arranged on the left to traffic situations which occur on the left behind the bicycle, and assigning the display device arranged on the right to traffic situations occurring to the right behind the bicycle.

The invention further relates to a bicycle, preferably a Pedelec, having a rear wheel and a steerable front wheel. Further, the bicycle includes a seat on which the user or rider of the bicycle can sit. Apart from this, the bicycle includes a handlebar for the steering of the front wheel by the user or rider and at least one radar sensor arranged in a rear region of the bicycle. By means of the at least one radar sensor, a rear surrounding region of the bicycle adjoining the bicycle at the back can be monitored at least in regions for the presence of at least one further road user. Further, the bicycle includes a control/regulating device which for receiving sensor data generated by the at least one radar sensor is connected to the same in a data-transmitting manner. Further, the bicycle according to the invention includes at least one, preferentially two display device(s) explained above, arranged on the handlebar and/or having a bicycle helmet according to the invention explained above. In both variants, the display device(s) is/are connected to the control/regulating device wirelessly or by wire, so that the control/regulating device can control the luminous elements of the same as a function of the sensor data received from the radar sensor. The bicycle according to the invention alerts the rider to road users present behind the bicycle, so that the rider can react to possible hazard situations accompanied by this. This reduces the risk of accidents involving these road users and thus brings about an increase in road safety.

According to a preferred embodiment, the at least one display device is arranged on the handlebar so that the rider sitting on the seat can see the luminous elements. According to a preferred embodiment of the bicycle according to the invention, the control/regulating device controls at least one of the luminous elements so that the same, concerning the emission of light, changes its previous state when by means of the radar sensor the presence of at least one road user has been detected and sensor data corresponding to this detection have been transmitted by a radar sensor to the control/regulating device. "Change of state" is to mean in particular a switching-on, switching-off and switching-over of the respective luminous element explained above. In this way, the user of the bicycle can be informed regarding the presence of such a road user and a hazard situation that may be accompanied by this under certain conditions. Regardless of this, the rider of the bicycle can always take into account the said information when controlling the bicycle.

Particularly practically, the at least one radar sensor can be designed and arranged on the bicycle so that the same can distinguish whether a detected road user is situated in a laterally left region behind the bicycle or in a laterally right region behind the bicycle or in a middle region between the laterally left and right regions. Thus, by suitably controlling the display device, a rider of the bicycle, as a function of the detected position, can be informed regarding a possible present road user is situated to the left behind the bicycle or to the right behind the bicycle or in a position in between.

According to a preferred embodiment, the handlebar can comprise a left and a right handlebar half, wherein on the left and/or right handlebar half a display device (each) is arranged, which luminous elements can be controlled by the control/regulating device. This allows, when using a suitable radar sensor which, as explained above, is able to detect whether a detected road user is situated at the back left, at the back right or centrically of the bicycle, to control the two display devices precisely as a function of the detected lateral position of the road user. Accordingly it is opportune to control luminous elements of the display devices arranged on the left handlebar half when a position of the road user to the left behind the bicycle has been detected, and accordingly control luminous elements of the display device arranged on the right handlebar half when a position of the road user to the right behind the bicycle has been detected. Both display devices can be controlled simultaneously when it has been detected that the road user is situated neither in the left nor in the right region, but in between, i.e. substantially in the middle behind the bicycle.

According to an advantageous further development, the handlebar comprises a left and a right handle. In the region of at least one of the two handles, preferentially in the region of both handles, a display device (each) according to the invention is arranged, which luminous elements can be controlled by the control/regulating device. This variant also allows, when using a suitable radar sensor which, as explained above, is able to detect whether a detected road user is situated at the back left, back right or centrically of the bicycle, to control the two display devices precisely as a function of the detected lateral position of the road user. Accordingly, it is opportune to control luminous elements of the display devices arranged on the left handle when a position of the road user to the left back behind the bicycle has been detected and accordingly control luminous elements of the display device arranged on the right handle when a position of the road user on the right behind the bicycle has been detected. Both display devices can be controlled simultaneously when it has been detected that the road user is situated neither in the left nor in the right region, but in between, i.e. substantially in the middle behind the bicycle.

According to an advantageous further development, the control/regulating device and the at least one radar sensor can also be embodied as a unit. This variant can be particularly easily installed on the bicycle and because of its simple construction is also cost-effective in the production.

Apart from this, the invention relates to a method for operating the bicycle according to the invention introduced above, so that the advantages of the bicycle according to the invention apply also to the method according to the invention. With the method according to the invention, the control/regulating device controls at least one of the luminous elements, preferentially multiple or all of the luminous elements, of the at least one display device so that regarding the emission of light it changes its previous state when, by means of the radar sensor, a change of state regarding at least one road user in the region behind the bicycle has been detected and sensor data corresponding to this change of state are transmitted to the control/regulating device.

Preferably, the change of state detected by the radar sensor includes or is a one-off detection of a certain road user, a change of position, in particular a change in distance of the detected road user relative to the bicycle, or a no-longer detection of a road user already detected previously. By way of this, it is possible to flexibly react to impending hazard situations up to the "all clear".

Particularly preferably, at least one luminous element, with the method according to the invention, is switched on or switched off or switched over when by means of the radar sensor a road user is detected. In this way, the rider is informed about the presence of a road user in the rearward region of his bicycle without the said rider having to turn his head to the back at regular intervals for this purpose in order to monitor the region behind his bicycle. Thus, the rider can concentrate on what is ahead of his bicycle.

Particularly preferably, at least one luminous element can also be switched on or switched off or switched over with the method according to the invention when by means of the radar sensor it is detected that the distance of a detected road user to the bicycle changes, in particular decreases. In this way, the rider of the bicycle is informed of the risk of a collision with the approaching road users so that he can take appropriate countermeasures.

Apart from this, at least one luminous element can be switched on or switched off or switched over with the method according to the invention when a road user already detected by means of the radar sensor can no longer be detected. In this way, the rider of the bicycle is informed to the effect that the said road user no longer poses any risk.

According to an advantageous further development of the method according to the invention, the control/regulating device, for switching-on/switching-off/switching-over of at least one luminous element, controls the display device arranged on the left handle when by means of the radar sensor it has been detected that the detected or relevant road user is situated in the lateral left region behind the bicycle. Accordingly, the control/regulating device for switching-on/switching-off/switching-over at least one luminous element, controls the display device arranged on the right handle when by means of the radar sensor it has been detected that the detected or relevant road user is situated in the laterally right region behind the bicycle. Finally, the control/regulating device for switching-on/switching-off/switching-over at least one luminous element control both the display device arranged on the left handle and also the display device arranged on the right handle, i.e. can switch on or off or over at least two luminous elements when by means of the radar sensor it has been detected that the road user is situated in a (middle) region between the left and right region behind the bicycle. This further development of the method allows informing the rider of the bicycle in a simple manner also regarding the lateral position of a road user present in the rearward region of the bicycle. This makes it easier for the rider of the bicycle to quickly react to the said road user since he knows the lateral position behind the bicycle of the said road user. The control of the display device arranged on the left handle proposed here when a road user has been detected in the region to the left behind the bicycle and the display device arranged on the right handle when a road user has been detected in the region at the back right, is also particularly intuitive for the rider of the bicycle.

According to a further preferred embodiment, one or more of the following is/are varied by means of the control/regulating device as a function of the detected change of state of the road user by controlling at least one, preferentially multiple or all of the luminous elements:
  colour of the emitted light,
  brightness of the emitted light,
  flashing frequency of the emitted light,
  number of the light emitting luminous elements.
In this way, an individual, characteristic form of display can be assigned to different traffic situations, in particular to hazard situations so that the rider of the bicycle can intuitively detect the type of traffic or hazard situation faced.

According to a further preferred embodiment, the control/regulating device generates, as a function of the detected change of state, by controlling at least one display device, a predetermined light sequence in which colour and/or brightness and/or flashing frequency of the light emitted by the display devices are changed in succession in a predefined manner with one, multiple or all luminous elements of the said display device. This further development of the method according to the invention allows informing the rider regarding a multiplicity of different traffic situations that may arise behind his bicycle. This can concern in particular the number of different detected road users, the type of the detected road user, for example a motor vehicle, in particular a passenger car or utility vehicle, a two-wheeler, in particular a motorcycle or a further bicycle or a pedestrian.

By suitably establishing a certain light sequence however it is also possible to inform the rider regarding the distance to the bicycle of the road user concerned, in particular a change in distance to the bicycle, and its speed, absolutely or relatively to the bicycle. This results in most diverse configuration possibilities and thus maximum flexibility. Particularly preferably, different changes of state are assigned to different predetermined light sequences. In this way, an individual light sequence can be assigned to different traffic situations, in particular hazard situations, so that the rider of the bicycle can more easily detect the type of traffic or hazard situation present.

From the above explanations it follows that the control/regulating device of the bicycle according to the invention introduced above is practically equipped/programmed for carrying out the method according to the invention explained above.

Further features and advantages of the invention are obtained from the subclaims, from the drawings and from the associated figure description by way of the drawings.

It is to be understood that the features mentioned above and still to be explained in the following cannot only be used in the respective combinations stated but also in other combinations or by themselves without leaving the scope of the present invention.

Preferred exemplarily embodiments of the invention are shown in the drawings and are explained in more detail in the following description, wherein same reference numbers relate to same of similar or functionally same components.

BRIEF DESCRIPTION OF THE DRAWINGS

It shows, in each case schematically.

DETAILED DESCRIPTION

Figure 1:
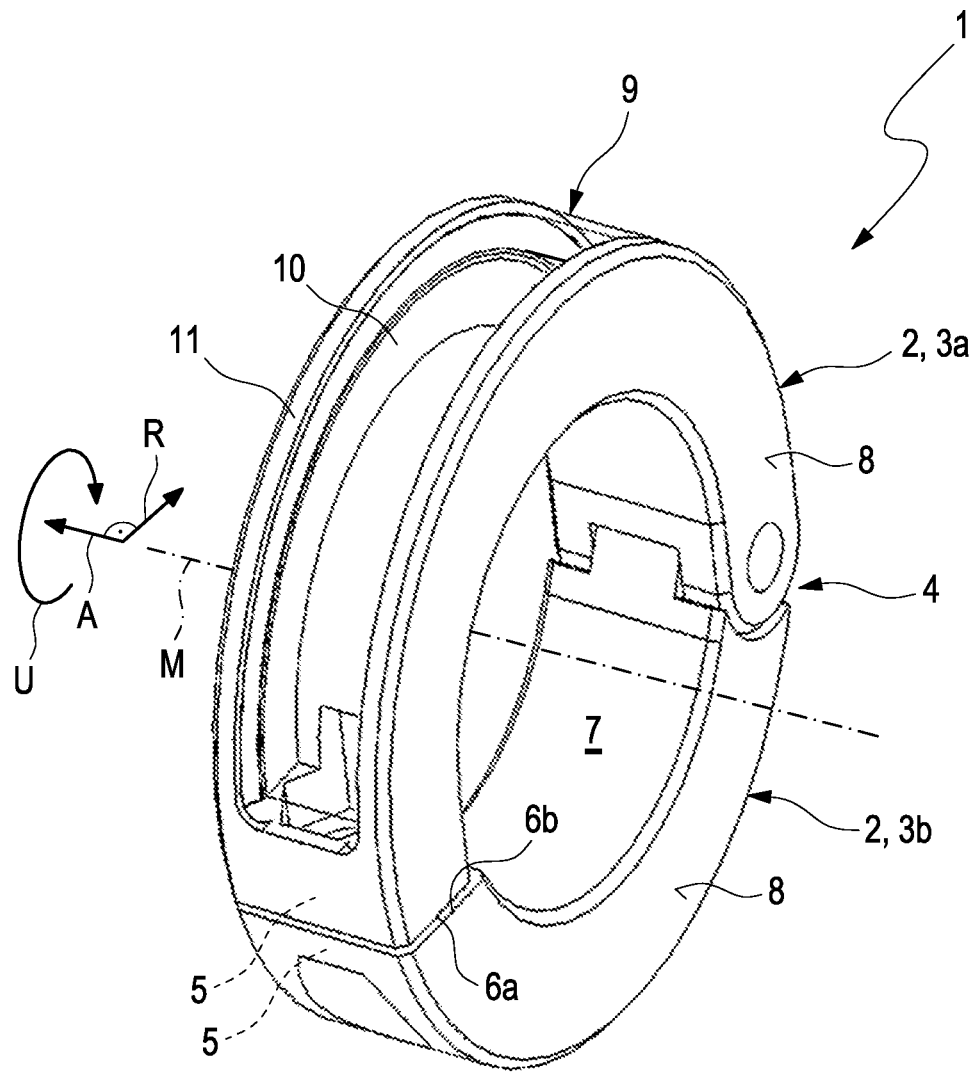
FIG. 1 an example of a display device according to the invention.
Figure 2:
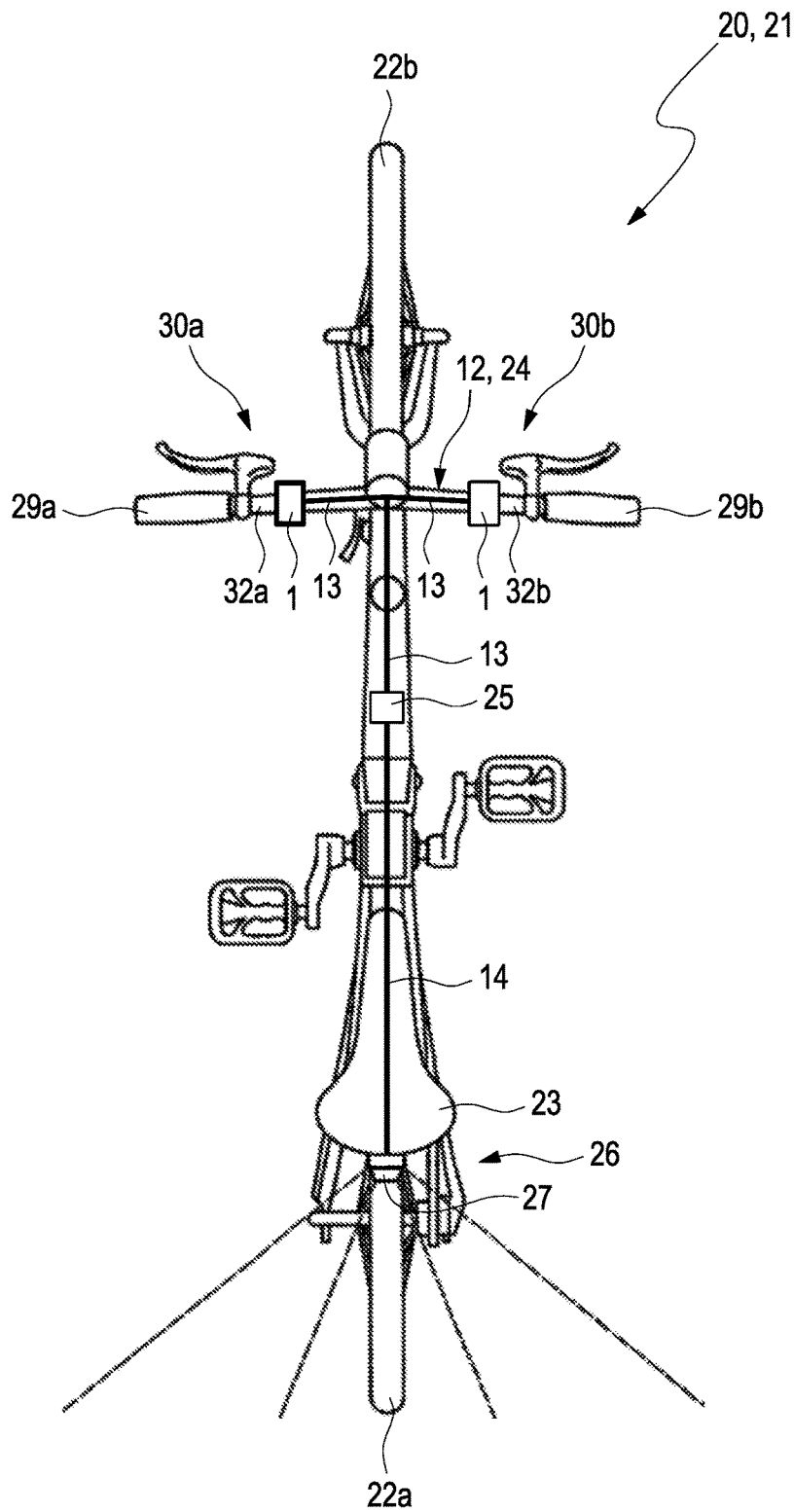
FIG. 2 an example of a bicycle according to the invention with two display devices according to the invention.

FIG. 1 illustrates in a perspective representation an example of a display device 1 according to the invention for a bicycle 20 (not shown in FIG. 1), which can be "Pedelec" 21 (see FIG. 2), as is shown in FIG. 2.

According to FIG. 1, the display device 1 includes an annular or hollow-cylindrical carrier 2, which is designed for mounting the display device 1 on a handlebar 24 of the bicycle 20. A centre longitudinal axis M extends along an axial direction A. A radial direction R extends perpendicularly to the axial direction A away from the centre longitudinal axis M. A circumferential direction U runs perpendicularly to the axial direction A and also perpendicularly to the radial direction R round about the centre longitudinal axis M. The annular carrier 2 encloses an annular opening 7 through which, in a state of the display device 1 mounted on the bicycle 20, the handlebar 24—which is typically a tubular body or a handlebar rod (not shown in FIG. 1)—engages. On the outside of the carrier 2 a plurality of electrically controllable luminous elements 10—in the example of the figures, these are light emitting diodes (LED)—for emitting light is arranged.

As is illustrated by FIG. 1, the annular carrier 2 can be formed in two parts and include two ring segment-shaped, preferentially semi-annular carrier elements 3a, 3b each. The two carrier elements 3a, 3b are connected to one another in an articulated manner by means of a hinge 4. Thus, they can be adjusted between a closed position shown in FIG. 1, in which the two carrier elements 3a, 3b enclose the annular opening 7 completely circumferentially and an open position (not shown in the figure), in which they can be mounted on the handlebar 24 of the bicycle 20 or demounted from the same.

For fixing the display device 1 on the handlebar 24, the carrier 2 includes a fixing device 5 which is arranged on the two circumferential ends 6a, 6b of the carrier elements 3a, 3b facing away from the hinge 4 and by means of which the two carrier elements 3a, 3b can be fixed to one another in the closed position. This fixing device 5 can be a latching device which is not noticeable in more detail in the closed state of the FIG. 1, with which the two carrier elements 3a, 3b can be releasably latched to one another in the closed position of the carrier 2.

In the example of FIG. 1, the shown luminous elements are arranged on an outer circumferential side 9 of one of the two carrier elements 3a, 3b, namely the carrier element 3a. It is conceivable in particular that all luminous elements 10 of the display device 1 are arranged on the outer circumferential side 9 of one or of both carrier elements 3a, 3b. However it is also conceivable that the luminous elements 10 are at least partly arranged on a front side 8 of one or both of the carrier elements 3a, 3b. Practically, the display device 1 in both variants is mounted on the handlebar 24 of the two-wheeler 2 so that the rider or user of the bicycle 20 can also see this and thus also perceive whether or when these emit light. Furthermore, a combination of the two variants explained above is conceivable (not shown). In this case, all luminous elements 10 can be arranged on the carrier 2 either on the circumferential side or on the front side. Alternatively to this, a first part of the luminous elements 10 can be arranged on the carrier 2 on the circumferential side and a second part of the luminous elements 10 on the front side.

In all the mentioned variants, the luminous elements 10 are designed so as to be separately controllable. To this end, an electrical connection which is not shown in the figures can be provided on the carrier 2, by means of which the luminous elements 10 can be electrically connected by wire to a control/regulating device 25 of the bicycle 20. In a variant, a wireless communications connection between control/regulating device 25 and bicycle 20 is also conceivable. All existing luminous elements 10 are designed so that they cannot only be controlled individually, but can each also emit light of different colours and of different brightness.

As is further evident from FIG. 1, the luminous elements 10 can be covered by means of a protective cover 11 that is transmissive to the light emitted by the luminous elements 10. As material for such a protective cover 10, a suitable plastic that is transmissive to the light of the luminous elements 10 for example is possible.

FIG. 2 shows in a schematic, greatly simplified representation a plan view of a bicycle 20 according to the invention, in which two display devices 1 according to the invention explained above are installed. The bicycle 20 includes a rear wheel 22a and a front wheel 22b that can be steered by the rider of the bicycle 20. Further, the bicycle 20 includes a seat 23, on which the user of the bicycle 20 can sit. Furthermore, the bicycle 20 includes a handlebar 24 for controlling the front wheel 22b, wherein on the handlebar 24 the two display devices 1 are arranged. The handlebar 24 comprises a handlebar rod 12 formed by a tubular body and has a left and a right handlebar half 32a, 32b, on which a left and a right handle 29a, 29b respectively is provided.

One of the two display devices 1 is arranged in the region 30a of the left handle 29a and thus in the left handlebar half 32a, the other one of the two display devices 1 is arranged in the region 30b of the right handle 29b and thus in the right handlebar half 32b. Fastening the two display devices 1 to the handlebar 24, which is designed as handlebar rod 12 or tubular body, takes place as explained above by way of the FIG. 1 and is not shown in more detail in FIG. 2 for the sake of clarity.

Apart from this, the bicycle 20 includes a radar sensor 27 arranged in a rear region 26 of the bicycle. By means of the radar sensor 27, a rear surrounding region 28 of the bicycle 20 adjoining the bicycle 20 at the back can monitored for the presence of road users. The radar sensor 27 is designed and arranged on the bicycle 20 so that the same can detect and distinguish whether a detected road user is situated in a laterally left region 31a behind the bicycle 20 or in a laterally right region 31b behind the bicycle 20 or in a (middle) region 31c between the laterally left and the right regions (31a, 31b).

Further, the bicycle 20 includes a control/regulating device 25, which for receiving sensor data generated by the radar sensor 27 is connected to the same in a data-transmitting manner (schematically indicated in FIG. 2 by a connecting line provided with the reference number 14) and is equipped for controlling the plurality of the luminous elements 10 as a function of the sensor data received. To this end, the control/regulating device 25 is electrically connected to the two display devices 1, i.e. by wire, or alternatively to this, wirelessly, which in FIG. 2 is to be schematically indicated by a connecting line marked with the reference number 13.

In the example of FIG. 2, the control/regulating device 25 and the radar sensor 27 are formed separately to one another and installed in different places in the bicycle 20, so that the control/regulating device 25 is arranged spaced apart from the radar 27. In a preferred variant, which is of a particularly simple construction and thus, cost-effective in the production, the control/regulating device 25 and the radar sensor 27 however can also be formed as a unit. In this case, the control/regulating device 25 is arranged in the bicycle 20 in the same position as the radar sensor 27.

In the configuration of the bicycle 20 explained above, the control/regulating device 25 can individually control the luminous elements 10 provided in the two display devices 1 so that the respective luminous element 10, relating the emission of light, changes its previous state when by means of the radar sensor 27 the presence of at least one road user has been detected and consequently sensor data corresponding to the said detection were transmitted by the radar sensor 27 to the control/regulating device 25.

The control/regulating device 25 of the bicycle 20 explained by way of FIG. 2 is designed for carrying out the method for operating the bicycle 20 according to the invention. In the following, the method is exemplarily explained by way of the bicycle 20 of FIG. 2 with the two display devices 1 arranged on the handlebar 24.

According to the method, the control/regulating device 25 controls at least one of the luminous elements 10, preferentially multiple or all of the luminous elements 10 of the display devices 1 so that the same, concerning the emission of light, changes its previous state when by means of the radar sensor 27 a change of state concerning a road user is detected and sensor data corresponding to this change of state are transmitted to the control/regulating device 25. Here, a change of state detected by the radar sensor 27 can be a one-off detection of a certain road user, a change of position of a detected road user, in particular a change in distance of the detected road user relative to the bicycle 20 and a no-longer detection of an already detected road user. As reaction to the sensor data received from the radar sensor 27, the control/regulating device 25 generates, as a function of the detected change of state, by controlling various luminous elements 10 present in the two display devices 1, a predetermined light sequence out of light emitted by these luminous elements 10.

In the example of FIG. 2, in which on the handlebar two different display devices 1 are provided, which can be controlled by the control/regulating device 25, the control/regulating device 25 controls the luminous elements 10 of the left display device 1, i.e. the display device 1 arranged in the left region 30a on the left handle 29a, i.e. it switches these luminous elements 10 on or off or over when the radar sensor 27 has detected that the detected road user is situated in the laterally left region 31a behind the bicycle 20. Accordingly, the control/regulating device 25 controls the luminous elements 10 of the right display device 1, i.e. the display device 1 arranged in the right region 30b on the right handle 29b, i.e. it switches these on or off or over when the radar sensor 27 has detected that the detected road user is situated in the laterally right region 31b behind the bicycle 20. Apart from this, the control/regulating device controls both luminous elements 10 of the display device 1 arranged in the left region 30*a* on the left handle 20*a* as well as luminous elements 10 of the display device 1 arranged in the right region 30*b* on the right handle 29*b* when it has been detected by the radar sensor 27 that the road user concerned is situated in the middle region 31*c* between the left and right regions 31*a*, 31*b* behind the bicycle 20.

In the simplest case, a luminous element 10 or multiple or all luminous elements 10 of one or both display devices 1 are switched on or switched off or switched over here when by means of the radar sensor 27 a road user is detected for the first time. Likewise, a luminous element 10 or multiple or all luminous elements 10 of one or both display devices 1 can be switched on or switched off or switched over when it is detected by means of the radar sensor 27 that the distance of a detected road user to the bicycle 20 changes, in particular decreases. Alternatively or additionally, a luminous element 10 or multiple or all luminous elements 10 of one or both display devices 1 can be switched on or switched off or switched over when a road user already detected by means of the radar sensor 27 can no longer be detected.

"Switching-on" is to mean that a luminous element 10 which did not previously emit any light is put into a state in which it now emits light. "Switching-off" here is to mean that a luminous element 10 which is already emitting light is put into a state in which it now no longer emits any light. "Switching-over" here is to mean that the type of the light emission is changed. This can mean in particular that the colour and/or the brightness of the light emitted by the luminous element is/are changed when the luminous element 10 is designed for emitting light of different colours.

As a further development, one or more of the following can be varied by means of the control/regulating device 25 as a function of the detected change of state by controlling at least one, preferentially multiple or all of the luminous elements 10 of the display device 1 concerned:

colour of the emitted light;
brightness of the emitted light;
flashing frequency of the emitted light;
number of the light-emitting luminous elements emitting light as described above.

In this way, different traffic situations, particular hazard situations can be assigned an individual display so that the rider of the bicycle can more easily detect the traffic or hazard situation present.

Apart from this, the control/regulating device 25 can be designed for generating predetermined light sequences in the display devices 1. Thus, the control/regulating device 25 can generate as a function of the change of state detected by means of the radar sensor 27 by controlling the respective display device 1, a predetermined light sequence in the luminous elements of this display device, with which colour and/or brightness and/or flashing frequency of the light emitted by the display device 1 or the luminous elements 10 of the same in one, multiple or all luminous elements 10 of the display devices are changed in a predetermined manner one after the other, i.e. as a function of the time. Particularly preferably, different changes of state are assigned different predetermined light sequences.

Figure 3:
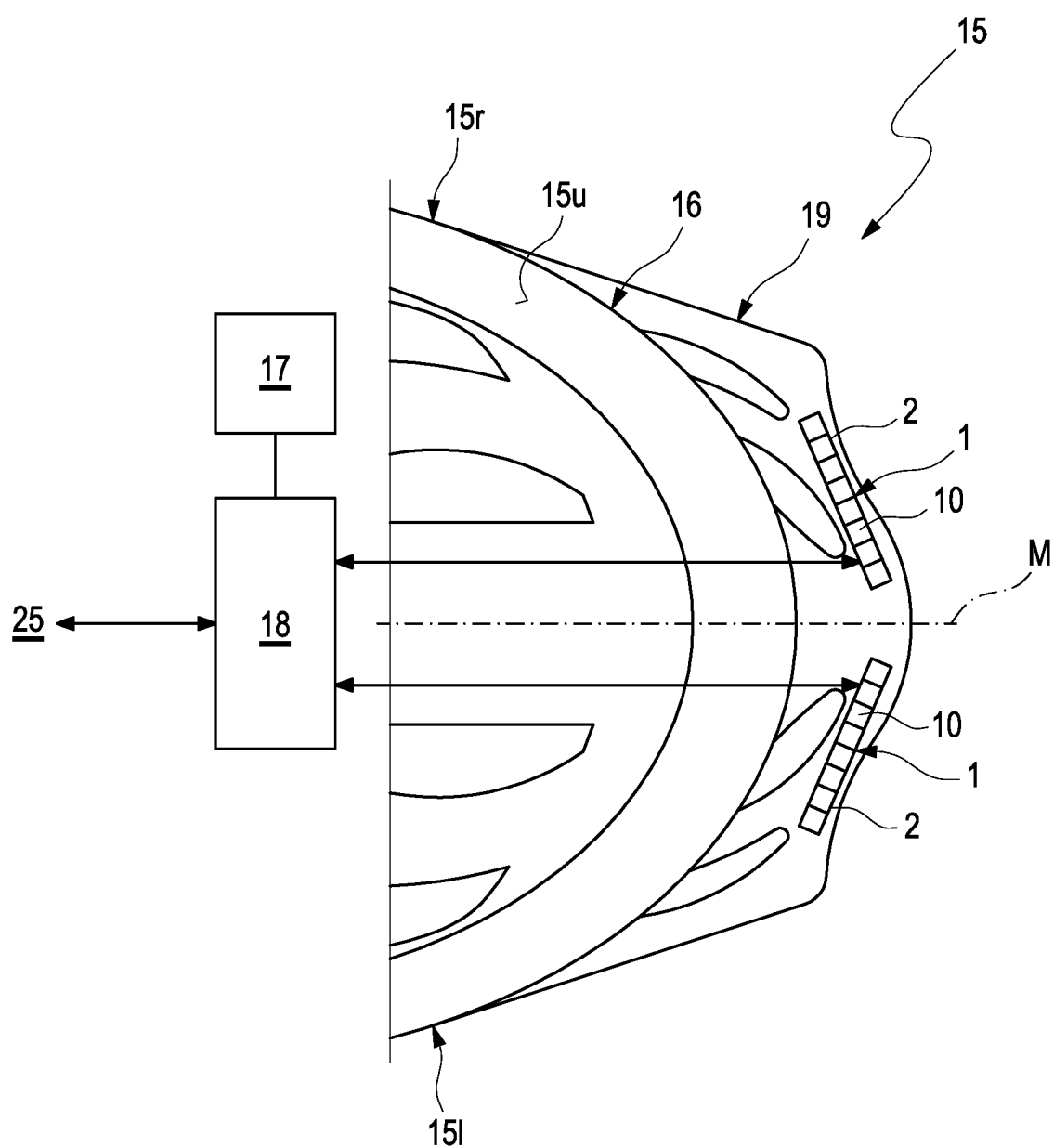
FIG. 3 an example of a bicycle helmet according to the invention in a plan view.

FIG. 3 illustrates an example of a bicycle helmet 15 according to the invention for use with the bicycle 20 according to the invention and for protecting the person wearing the helmet from head injuries when the said person uses the bicycle 20. The bicycle helmet 15 includes a helmet body 16 formed shell-like in the conventional manner for absorbing external mechanical shocks and impacts. the bicycle helmet 15 additionally includes a helmet visor 19 mounted to the helmet body 16. FIG. 1 shows the helmet with respect to a usage position in which the helmet wearer wears the bicycle helmet 15 on his head in a plan view of a lower side 15*u* of the helmet 15. Two display devices 1 according to the invention arranged next to one another are noticeable on the helmet visor 19, each with carrier 2 and luminous elements 10. This carrier 2 can be embodied in a mechanically rigid manner or as an elastic strip, wherein the latter embodiment can be more easily adapted to uneven helmet visors 19. The two display devices 1 are arranged on the helmet visor 19 so that they are visible to the helmet wearer while wearing the bicycle helmet 15 on his head. Thus, the helmet wearer can detect if or when the luminous elements 10 emit light.

Furthermore, the bicycle helmet 15 includes an electrical energy store 17 for supplying the display devices with electric energy which is indicated only schematically in FIG. 3. The energy store 17 can be a—preferably rechargeable—electric battery which can be particularly preferably integrated in the helmet body 16. A communications unit 18 of the bicycle helmet 15 for the wireless connecting of the display devices 1 with the control/regulating device 25 of the bicycle 20 is likewise indicated only schematically.

As is clearly evidenced by FIG. 3, the bicycle helmet 15 has a centre longitudinal axis M which divides the bicycle helmet 15 into a left and into a right helmet half 15*l*, 15*r*. Here, one of the two display devices 1 is arranged in the left helmet half 15*l* on the helmet visor 19 and the other display device 1 in the right helmet half 15*r* on the helmet visor 19. The functioning of the two display devices 1 present on the bicycle helmet 15 according to FIG. 3 corresponds to that of the two display devices 1 provided on the handlebar 24 according to FIG. 2.

The method explained above can also be employed using the bicycle helmet 15 according to the invention, wherein the two display devices 1 provided on the helmet visor 19 on the left and the right assume the same function as the display devices 1 arranged, with bicycle 20 of FIG. 2, in the region 30*a* and 30*b* respectively of the left and right handle 29*a* and 29*b* respectively. In this case there is no wired connection between the control/regulating device 25 of the bicycle 20 and the bicycle helmet 15 for the electrical signal transmission between display device 1 and control/regulating device 25, but a wireless communications connection, which makes possible a data transmission between the communications unit 18 and a communications unit (not shown)—integrated for example in the control/regulating device 25—for the wireless communication between the display devices 1 present on the bicycle helmet 15 and the control/regulating device 25 of the bicycle 20. When the bicycle helmet 15 according to the invention with the two display devices 1 is used, the control/regulating device 25 of the bicycle 20 cannot only control the two display devices 1 provided on the handlebar 24, but additionally—or also alternatively—the two display devices 1 arranged on the helmet visor 19 of the bicycle helmet 15. This means that the control/regulating device 25 can control the display devices 1 arranged in the region 30*a* of the left handle 29*a* analogously to the display devices 1 provided on the left of the helmet visor 19 and can analogously control the display devices 1 arranged in the region 30*b* of the right handle 29*b* analogously to the display devices 1 provided on the right of the helmet visor 19.

In such a scenario, the control/regulating device 25 controls the luminous elements 10 of the display device 1 arranged on the left of the helmet visor 19, i.e. it switches these on or off or over when it has been detected by the radar sensor 27 that the detected road user is situated in the laterally left region 31*a* behind the bicycle 20. Accordingly, the control/regulating device 25 controls the luminous elements 10 of the display device 1 arranged on the helmet visor 19 on the right, i.e. it switches these on or off or over when it has been detected by the radar sensor 27 that the detected road user is situated in the laterally right region 31*b* behind the bicycle 20. Accordingly, the control/regulating device 25 controls both luminous elements 10 of the left display device 1 and also luminous elements 10 of the right display device 1 when it has been detected by the radar sensor 27 that the road user is situated in the middle region 31*c* between the left and right region 31*a,* 31*b* behind the bicycle 20.

Obviously it is also easily conceivable to omit any display devices 1 whatsoever on the handlebar 24 of the bicycle 20 and instead exclusive used the display devices 1 provided on the bicycle helmet 15.

In any case, the method aspects explained above, which relate to the control of the two display devices 1 provided on the handlebar 24, apply also mutatis mutandis to the two display devices 1 provided on the bicycle helmet 15.

The invention claimed is:

1. A display device for at least one of a bicycle and a bicycle helmet, comprising:
   a carrier for mounting on a handlebar,
   a plurality of controllable luminous elements arranged on the carrier, and
   wherein the carrier includes an annular or hollow-cylindrical geometry and is structured in two parts for mounting on the handlebar and includes two ring segment-shaped carrier elements, the two ring segment-shaped carrier elements connected to one another in an articulated manner via a hinge and adjustable between a closed position where the two carrier elements enclose an annular opening, and an open position where the two carrier elements are mountable on the handlebar or demountable from the handlebar.

2. The display device according to claim 1, wherein the carrier further includes a fixing device arranged on two circumferential ends of the two carrier elements facing away from the hinge, and wherein the fixing device fixes the two carrier elements to one another in the closed position.

3. The display device according to claim 1, wherein at least one of the plurality of luminous elements is arranged on a front side of the carrier.

4. The display device according to claim 1, wherein one of:
   at least one of the plurality of luminous elements is arranged on an outer circumferential side of the carrier;
   all of the plurality of luminous elements are arranged on a front side of the carrier; or
   a first part of the plurality of luminous elements is arranged on the carrier on a circumferential side of the carrier and a second part of the plurality of luminous elements is arranged on a front side of the carrier.

5. The display device according to claim 1, wherein on the carrier an electrical connection is provided, wherein the electrical connection electrically connects the plurality of luminous elements by wire to a control/regulating device.

6. The display device according to claim 1, wherein the plurality of luminous elements are configured to be separately controllable.

7. The display device according to claim 1, wherein at least one of:
   the plurality of luminous elements are covered via a protective cover that is transmissive for the light emitted by the plurality of luminous elements;
   at least one of the plurality of luminous elements is configured to emit light with one of at least two different colours; and
   at least one of the plurality of luminous elements is configured to emit light with different brightness.

8. A bicycle, comprising:
   a rear wheel and a front wheel that is steerable by a user;
   a seat, on which the user can sit;
   a handlebar for controlling the front wheel;
   at least one radar sensor arranged in a rear region configured to monitor a rear surrounding region at a back at least in regions for the presence of at least one further road user;
   a control/regulating device connected to the at least one radar sensor in a data-transmitting manner for receiving sensor data generated by the at least one radar sensor;
   at least one display device arranged on the handlebar, the at least one display device including a carrier and a plurality of controllable luminous elements arranged on the carrier;
   wherein the at least one display device is connected wirelessly or by wire to the control/regulating device, so that the control/regulating device can control the plurality of luminous elements as a function of the sensor data received; and
   wherein the carrier includes an annular or hollow-cylindrical geometry and is structured in two parts for mounting on the handlebar and includes two ring segment-shaped carrier elements, the two ring segment-shaped carrier elements connected to one another in an articulated manner via a hinge and adjustable between a closed position where the two carrier elements enclose an annular opening, and an open position where the two carrier elements are mountable on the handlebar or demountable from the handlebar.

9. The bicycle according to claim 8, wherein the at least one display device is arranged on the handlebar so that the user sitting on the seat can see the plurality of luminous elements.

10. The bicycle according to claim 8, wherein the control/regulating device controls at least one of the plurality of luminous elements such that the at least one luminous element, relating to the emission of light, changes its previous state when, via the at least one radar sensor, the presence of at least one road user has been detected and sensor data corresponding to the said detection were transmitted to the control/regulating device by the at least one radar sensor.

11. The bicycle according to claim 8, wherein the at least one radar sensor is structured and arranged such that it can be distinguished by the at least one radar sensor whether a detected road user is situated in a laterally left region behind the bicycle or in a laterally right region behind the bicycle or in a middle region between the laterally left region and the laterally right region.

12. The bicycle according to claim 8, wherein the handlebar includes a left handlebar half and a right handlebar half, wherein on at least one of the left handlebar half and the right handlebar half the display device is arranged in each case, and wherein the plurality of luminous elements are controllable by the control/regulating device.

13. The bicycle according to claim 8, wherein the handlebar includes a left handle and a right handle, wherein in a left region or a right region of at least one of the left handle and the right handle the display device is arranged in each case, and wherein the plurality of luminous elements are controllable by the control/regulating device.

14. The bicycle according to claim 8, wherein the carrier further includes a fixing device arranged on two circumferential ends of the two carrier elements facing away from the hinge, and wherein the fixing device fixes the two carrier elements to one another in the closed position.

15. A method for operating a bicycle, comprising:
monitoring a surrounding rear region of the bicycle via at least one radar sensor;
transmitting sensor data from the at least one radar sensor to a control/regulating device;
controlling via the control/regulating device at least one of a plurality of luminous elements of at least one display device such that regarding to the emission of light the at least one luminous element changes its previous state when via the at least one radar sensor a change of status regarding a road user behind the bicycle has been detected and the sensor data corresponding to the change of status are transmitted to the control/regulating device by the at least one radar sensor;
the control/regulating device for switching-on/switching-off/switching-over of the at least one luminous element controls the at least one display device arranged on a left handle of a handlebar when via the at least one radar sensor it has been detected that the detected road user is situated in a laterally left region behind the bicycle;
the control/regulating device for the switching-on/switching-off/switching-over of the at least one luminous element controls the at least one display device arranged on a right handle when via the at least one radar sensor it has been detected that the detected road user is situated in a laterally right region behind the bicycle; and
the control/regulating device for the switching-on/switching-off/switching-over of the at least one luminous element controls both the at least one display device arranged on the left handle and the at least one display device arranged on the right handle when via the at least one radar sensor it has been detected that the road user is situated in a middle region between the left region and the right region behind the bicycle.

16. The method according to claim 15, wherein the change of status detected by the at least one radar sensor includes at least one of:
a one-off detection of a certain road user;
a change of position of the detected road user relative to the bicycle; and
a no-longer detection of a road user already detected previously.

17. The method according to claim 15, wherein the at least one luminous element is switched on or switched off or switched over when via the at least one radar sensor the road user is detected.

18. The method according to claim 15, wherein the at least one luminous element is switched on or switched off or switched over when via the at least one radar sensor it is detected that a distance of the detected road user to the bicycle changes.

19. The method according to claim 15, wherein the at least one luminous element is switched on or switched off or switched over when the road user already detected via the at least one radar sensor is no longer detected.

20. The method according to claim 15, wherein the control/regulating device is configured to vary one or more from the following as a function of the detected change of state by controlling the at least one luminous element of the display device:
colour of the emitted light,
brightness of the emitted light,
flashing frequency of the emitted light, and
number of the luminous elements that emit light.

21. The method according to claim 15, wherein the control/regulating device generates a predetermined light sequence as a function of the detected change of status by controlling the display device, wherein the predetermined light sequence includes changing at least one of colour, brightness, and flashing frequency of the light emitted by the display device by the at least one luminous element one after the other in a certain manner.

22. A bicycle, comprising:
at least one radar sensor configured to monitor a rear surrounding region;
at least one display device including a carrier and a plurality of controllable luminous elements arranged on the carrier;
a control/regulating device connected to the at least one radar sensor in a data-transmitting manner for receiving sensor data generated by the at least one radar sensor, wherein the control/regulating device is configured to control at least one of the plurality of luminous elements of the at least one display device such that regarding to the emission of light the at least one luminous element changes its previous state when via the at least one radar sensor a change of status regarding a road user in the rear surrounding region has been detected and the sensor data corresponding to the change of status are transmitted to the control/regulating device by the at least one radar sensor; and
wherein the carrier includes an annular or hollow-cylindrical geometry and is structured in two parts for mounting on the handlebar and includes two ring segment-shaped carrier elements, the two ring segment-shaped carrier elements connected to one another in an articulated manner via a hinge and adjustable between a closed position where the two carrier elements enclose an annular opening, and an open position where the two carrier elements are mountable on the handlebar or demountable from the handlebar.

23. The bicycle according to claim 22, wherein the carrier further includes a fixing device arranged on two circumferential ends of the two carrier elements facing away from the hinge, and wherein the fixing device fixes the two carrier elements to one another in the closed position.

* * * * *